United States Patent
Ishizaki et al.

(10) Patent No.: US 9,372,292 B2
(45) Date of Patent: Jun. 21, 2016

(54) IMAGING APPARATUS HAVING LIGHT SOURCE IDENTIFICATION AND IMAGE QUALITY CORRECTION FUNCTIONS AND METHOD FOR CONTROLLING IMAGING APPARATUS

(71) Applicant: CANON KABUSHIKI KAISHA, Tokyo (JP)

(72) Inventors: Fumihiko Ishizaki, Yokohama (JP); Shinya Urisaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 17 days.

(21) Appl. No.: 14/564,574

(22) Filed: Dec. 9, 2014

(65) Prior Publication Data
US 2015/0172525 A1 Jun. 18, 2015

(30) Foreign Application Priority Data

Dec. 13, 2013 (JP) ................. 2013-258425
Dec. 13, 2013 (JP) ................. 2013-258426
Jul. 2, 2014 (JP) ................. 2014-137249
Jul. 2, 2014 (JP) ................. 2014-137250

(51) Int. Cl.
*H04N 9/73* (2006.01)
*G01J 3/28* (2006.01)
(Continued)

(52) U.S. Cl.
CPC ............... *G02B 5/208* (2013.01); *G02B 5/223* (2013.01); *H04N 5/238* (2013.01); *H04N 5/23229* (2013.01); *H04N 9/735* (2013.01)

(58) Field of Classification Search
CPC . H04N 13/0025; H04N 9/735; H04N 1/6077; H04N 9/3182; H04N 1/6086; G01J 3/00; G01J 3/0272; G01J 3/28; G01J 3/51; G01J 3/2823; G01J 3/40; G01J 3/0229; G01J 2003/323; G01J 3/4406; G01J 3/443; G01J 2003/1213; G01N 21/31
USPC ............. 348/370, 223.1–226.1; 356/300–334
See application file for complete search history.

(56) References Cited

U.S. PATENT DOCUMENTS

| | | | |
|---|---|---|---|
| 2004/0135975 A1* | 7/2004 | Wang ..................... | G03B 21/14 353/84 |
| 2005/0096505 A1* | 5/2005 | Imaizumi ............... | H04N 9/735 600/180 |

(Continued)

FOREIGN PATENT DOCUMENTS

| | | |
|---|---|---|
| JP | 2006-146081 A | 6/2006 |
| JP | 2007-110485 A | 4/2007 |
| JP | 2012-180333 A | 9/2012 |

*Primary Examiner* — Chia-Wei A Chen
(74) *Attorney, Agent, or Firm* — Canon U.S.A., Inc. IP Division (57) ABSTRACT

An imaging apparatus includes an imaging unit configured to convert an incident light flux from an optical system into an electric signal, a band-cutting element disposed between the optical system and the imaging unit, having a band-cut function of performing band-cutting to enable distinguishing between wavelengths corresponding to bright line positions of a light source having bright lines, a control unit configured to control the band-cut function of the band-cutting element, an identification unit configured to identify a light source of an image captured by the imaging unit through comparison between a first image signal captured by the imaging unit when the band-cut function of the band-cutting element is ON and a second image signal captured by the imaging unit when the band-cut function of the band-cutting element is OFF, and an image processing unit configured to perform image processing based on the light source identified by the identification unit.

20 Claims, 6 Drawing Sheets

(51) Int. Cl.
  *G01J 3/40*   (2006.01)
  *G01J 3/12*   (2006.01)
  *G02B 5/20*   (2006.01)
  *G02B 5/22*   (2006.01)
  *H04N 5/232*  (2006.01)
  *H04N 5/238*  (2006.01)

(56) References Cited

U.S. PATENT DOCUMENTS

| | | | | |
|---|---|---|---|---|
| 2010/0145416 A1* | 6/2010 | Kang | ................ | A61B 5/0059 607/89 |
| 2011/0063433 A1* | 3/2011 | Thonhauser | ......... | G01N 21/251 348/135 |
| 2011/0096157 A1* | 4/2011 | Fine | ................ | G02B 21/0008 348/79 |
| 2011/0128421 A1* | 6/2011 | Yahata | ................ | G06T 5/003 348/241 |
| 2012/0044394 A1* | 2/2012 | Komiya | ............... | H04N 5/3456 348/266 |
| 2012/0075449 A1* | 3/2012 | Yasuda | ............. | A61B 1/00009 348/68 |
| 2012/0274799 A1* | 11/2012 | Wang | ................ | H04N 9/735 348/222.1 |
| 2013/0278791 A1* | 10/2013 | Takahashi | ............. | H04N 9/045 348/223.1 |
| 2014/0085502 A1* | 3/2014 | Lin | ................ | H04N 5/2258 348/223.1 |
| 2015/0070528 A1* | 3/2015 | Kikuchi | ................ | H04N 9/07 348/224.1 |
| 2015/0092034 A1* | 4/2015 | Iwane | ................ | H04N 5/243 348/68 |
| 2015/0138319 A1* | 5/2015 | Ishii et al. | .......... | H04N 13/0025 348/46 |

* cited by examiner

IMAGING APPARATUS HAVING LIGHT SOURCE IDENTIFICATION AND IMAGE QUALITY CORRECTION FUNCTIONS AND METHOD FOR CONTROLLING IMAGING APPARATUS

BACKGROUND OF THE INVENTION

1. Field of the Invention

The present invention relates to an imaging apparatus having light source identification and image quality correction functions, and a method for controlling the imaging apparatus.

2. Description of the Related Art

Imaging apparatus operations include a technique for identifying a lighting environment of the subject and performing image quality correction including white balance adjustment according to the lighting environment.

Japanese Patent Application Laid-Open No. 2007-110485 discusses a method for identifying a fluorescent lamp and a mercury lamp based on a light quantity ratio of a green light detection element (green element) and a monochrome light detection element (monochrome element). This method utilizes the fact that the effect of the green light emission intensity on the bright line spectrum differs between the fluorescent lamp and the mercury lamp.

Japanese Patent Application Laid-Open No. 2006-146081 discusses a method for identifying light sources based on the light quantity ratio of the light-extinction state using an electrochromic (EC) element to the non-light-extinction state (normal state). When a voltage is applied, the electrochromic element enters a colored state and performs a band-cut function on transmitted light in a specific wavelength range. When a voltage having the opposite polarity to the voltage in the colored state is applied, the electrochromic element enters a color-fading state and loses the band-cut function. The method performs band-cutting to acquire wavelength information of light sources, and discriminate an A light source (halogen lamp) and a fluorescent lamp.

However, all of the above-described conventional light source identification methods deals with identification target light sources having a large full width at half maximum (100 nm or more), and bright-line light sources having a full width at half maximum of about 3 to 30 nm is not imagined as identification targets.

SUMMARY OF THE INVENTION

The present invention is directed to providing an imaging apparatus capable of simply and accurately identifying various types of light sources including bright-line light sources, and a method for controlling the imaging apparatus.

The imaging apparatus according to the present invention includes an imaging unit configured to convert an incident light flux from an optical system into an electric signal, a band-cutting element disposed between the optical system and the imaging unit, and provided with a band-cut function of performing band-cutting to enable distinguishing between wavelengths corresponding to bright line positions of a light source having bright lines, a control unit configured to control the band-cut function of the band-cutting element, an identification unit configured to identify a light source of an image captured by the imaging unit through comparison between a first image signal captured by the imaging unit when the band-cut function of the band-cutting element is ON and a second image signal captured by the imaging unit when the band-cut function of the band-cutting element is OFF, and an image processing unit configured to perform image processing based on the light source identified by the identification unit.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

A first exemplary embodiment of the present invention will be described in detail below. The present exemplary embodiment describes a digital camera as an example of an imaging apparatus. However, the present exemplary embodiment is applicable not only to apparatuses capable of shooting an image as a main purpose, such as digital cameras, but also to apparatuses having a built-in or externally connected imaging apparatus, such as mobile phones, personal computers (such as laptop type, desktop type, and tablet type PCs), and game machines. Therefore, the "imaging apparatus" in the present specification is intended to include any electronic apparatuses having the imaging function.

The present exemplary embodiment identifies light sources including bright-line light sources.

There is a technique for observing only the light quantity entering an image sensor, and, when the light quantity is equal to or larger than a threshold value, automatically recognizing the existence of a light source and identifying the type of the light source. However, if the identification is based only on the light quantity, for example, this technique may misidentify a fluorescent lamp light source as sunlight or halogen lamp light.

Bright-line light sources include a fluorescent lamp, a mercury lamp, a white light emitting diode (LED), a green LED, and a blue LED. To simply and correctly perform the above-described identification on bright-line light sources as well as broad light sources such as sunlight and a halogen lamp, it is necessary to focus attention not only on light quantities but also on wavelength positions.

According to the method discussed in Japanese Patent Application Laid-Open No. 2007-110485, it is necessary to distribute detection elements to many image sensors, and therefore lacks simplicity. Further, distribution of detection elements will change the image quality of captured images. Further, since a color filter is arranged in front of a distributed green element, the full width at half maximum of the wavelength range to be transmitted is 100 nm or more. This value is much larger than the full width at half maximum (3 to 30 nm) of bright lines of bright-line light sources. As a result, the method causes a small difference in the light quantity ratio between types of bright-line light sources, and therefore lacks identification accuracy.

In the method discussed in Japanese Patent Application Laid-Open No. 2006-146081, the wavelength range subjected to band-cutting by an EC element is 550 to 800 nm (it can be judged that an inorganic material is used). The wavelength range subjected to band-cutting is 250 nm which is much larger than the full width at half maximum (3 to 30 nm) of bright lines of bright-line light sources (including a fluorescent lamp). As a result, the wavelength subjected to band-cutting does not correspond to bright line positions of bright-line light sources (including a fluorescent lamp).

The present exemplary embodiment simply and correctly identifies light sources by using organic EC elements and guest host liquid crystals of which the full width at half maximum can absorb bright-line light sources. The principle of light source identification according to the present exemplary embodiment will be described below. In the lighting environment at the time of shooting, both a broad light source (having a 200- to 500-nm wavelength range) and a bright-line light source (having a 3- to 30-nm full width at half maximum of bright lines) are assumed. The following considers a case of a device (band-cutting element) which cuts light of a specific wavelength range in the 10- to 100-nm width during voltage application. More specifically, the light quantity when the band-cut function is ON will be considered. In this case, the band-cutting element outputs a light quantity of 1 when a light quantity of 1 is input to it while the band-cut function is OFF.

In the case of a broad light source, regardless of band-cut positions of the band-cutting element, the light quantity after light passes through the band-cutting element becomes almost 1 when the band-cut function is ON. This is because only a part of light having a wide wavelength width is cut. In the case of a bright-line light source, if band-cut positions of the band-cutting element are deviated from bright line positions, bright lines are hardly cut, and the light quantity after light passes through the band-cutting element becomes almost 1. This is because bright lines remain also when the band-cut function is ON. If band-cut positions coincide with bright line positions, the light quantity after light passes through the band-cutting element becomes almost 0. This is because bright lines are cut when the band-cut function is ON.

The present exemplary embodiment utilizes the above-described characteristics. Specifically, the method according to the present exemplary embodiment operates band-cutting elements corresponding to a plurality of bright line positions (wavelengths) having different band-cut positions (bands subjected to band-cutting), and calculates the ratios of the light quantity when the band-cutting element is OFF, to the light quantity when the band-cutting element is ON. When all of the obtained light quantity ratios are close to 1, the light source can be identified as a broad light source. When at least one of obtained light quantity ratios is close to 0, the light source can be identified as a bright-line light source corresponding to the bright line positions subjected to band-cutting at that time.

When any one of ratios of the output light quantity to the input light quantity of the band-cutting elements is close to 0, it can be determined that there exists a specific bright-line light source having bright lines at band-cut positions of the relevant band-cutting element. Thus, after a light source has been identified as a bright-line light source, the type of the bright-line light source can be identified.

It is difficult by the method discussed in Japanese Patent Application Laid-Open No. 2006-146081 to perform identification similar to the present invention. In both cases of a broad light source and a bright-line light source, the light quantity when the band-cutting element is turned ON is close to 0, i.e., both show almost same values. This is because the wavelength width subjected to band-cutting is as wide as 250 nm, and almost the entire light is cut regardless of the type of the light sources.

In the present exemplary embodiment, for example, organic EC elements and guest host liquid crystals can be used as band-cutting elements.

An organic EC element is produced by arranging a spacer having a fixed thickness (for example, 1 to 500 μm) between two sheets of conductive glass and injecting a solution of dissolved organic low-molecular compound and salt into the formed space to be sealed. When one conductive glass is set to the higher potential (turned ON) than another glass, electrons of the organic low-molecular compound are drawn out to the conductive glass set to the higher potential. The organic low-molecular compound is neutral and has absorption bands only in the ultraviolet region. However, after electrons have been drawn out, it is converted to a radical cation having absorption bands in the visible light region. When the conductive glass once set to the high potential is set to the low potential (OFF), electrons are supplied to the radical cation, and the organic low-molecular compound becomes neutral and returns to the state where it has absorption bands only in the ultraviolet region.

Wavelength positions and wavelength widths, and cuttable light quantities (transmissivity) of absorption bands (band-cut) can be controlled by the type and density of the low organic low-molecular compound, the type of the solvent used as the solution, and the applied potential.

FIG. 1 illustrates emission spectrums of different types of bright-line light sources. Each light source has different bright line positions and bright line widths. To bring these bright line positions and bright line widths close to the band-cut positions and band-cut widths of the organic EC elements, it is necessary to change the type of the organic low-molecular compound used for the organic EC elements. More specifically, it is necessary to change the substituent of the compound discussed in Japanese Patent Application Laid-Open No. 2012-180333 in response to changes in the band-cut positions and band-cut widths. In the present exemplary embodiment, it is presumed that, taking in consideration of the interval between the bright lines illustrated in FIG. 1, when band-cut widths are designed to be within 20 nm centering on wavelengths corresponding to bright lines, bright lines can be suitably distinguished. The band-cut width is designed in this way. However, if a band-cutting element 107 is designed aiming to limit a target to a plurality of bright lines (as described below), bright lines can be suitably distinguished, for example, with a band-cut width of about 40 nm. Referring to FIG. 1, center wavelengths of the band-cut positions corresponding to the bright line positions of each light source may be 615 nm (613 nm), 595 nm (590 nm, 593 nm), 465 nm (466 nm), 545 nm (547 nm), and 480 nm (490 nm, 477 nm). More specifically, while including any one of these wavelengths, the band-cutting element 107 is designed with a band-cut width of ±10 nm.

The guest host liquid crystal is made by arranging a spacer having a fixed thickness (for example, 10 to 300 μm) between two sheets of conductive glass and injecting a mixture of pigment (guest) and liquid crystal (host) into the formed space to be sealed.

When a voltage is applied between the two sheets of conductive glass, the orientation of the liquid crystal (host) changes, and, accordingly, the orientation of the pigment (guest) changes.

In a following case, it is presumed that a polarizing plate that transmits light showing perpendicular polarization is arranged outside the conductive glass on the incidence side. In this case, further, a pigment (guest) for absorbing light showing polarization in a molecule short axis direction, and liquid crystal (host) having a positive dielectric constant anisotropy are used. When a voltage is not supplied, the molecule short axis of the pigment (guest) orthogonally intersects with the polarization direction (perpendicular direction) of light, and therefore the light is transmitted. When a voltage is applied, the molecule short axis of the pigment (guest) is in parallel with the polarization direction (perpendicular) of light, and therefore the light is absorbed.

Wavelength positions and wavelength widths, and cuttable light quantities (transmissivity) of absorption bands (band-cut) can be controlled by the pigment (guest), the type and relative amount of the liquid crystal (host) and the applied potential. Further, the above-described polarizing plate is not necessarily required for realization of the band-cut function.

To bring close the bright line positions and bright lines widths of various types of light sources illustrated in FIG. 1, to the band-cut position and band-cut width of the guest host liquid crystal, it is necessary to select a suitable type of pigment (guest).

Figure 1A:
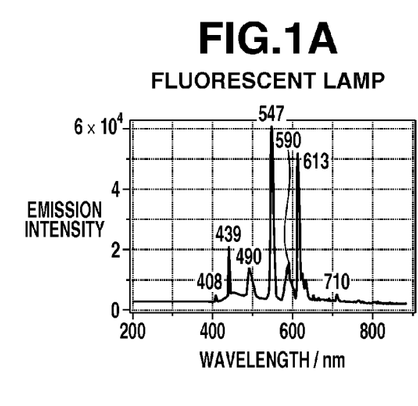
FIGS. 1A to 1E illustrate emission spectrums of various types of bright-line light sources.
Figure 1B:
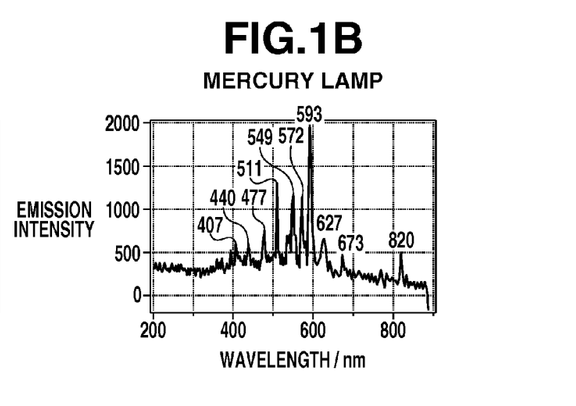
Figure 1C:
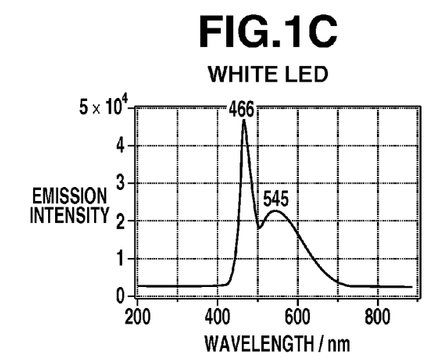
Figure 1D:
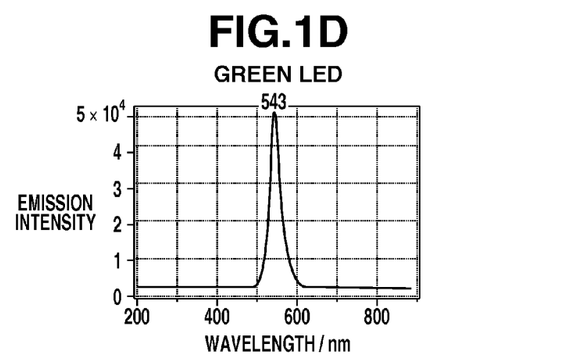
Figure 1E:
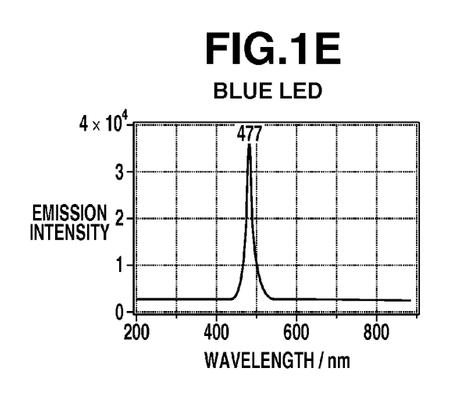
Figure 2:
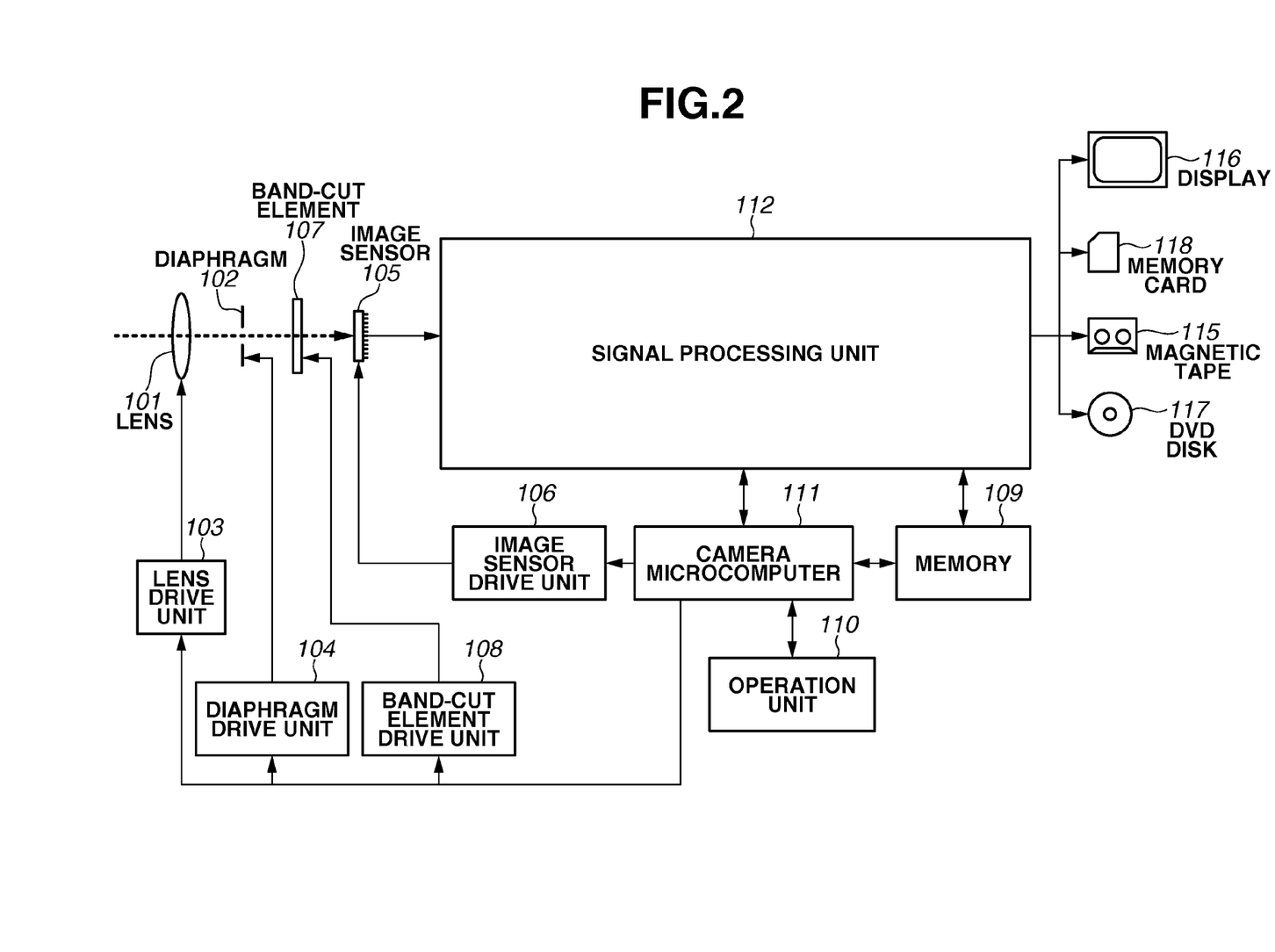
FIG. 2 schematically illustrates a configuration of an imaging apparatus according to the present invention.

FIG. 2 illustrates a configuration of the imaging apparatus according to the present exemplary embodiment, including the band-cutting element (an organic electrochromic element or a guest host liquid crystal) and a drive unit for the band-cutting element. Realization of the functions and operation processes of the imaging apparatus according to the present exemplary embodiment will be described in detail below with reference to FIG. 2.

The imaging apparatus includes a lens 101, and a diaphragm 102 is arranged on the rear side of the lens 101 in the optical axis direction when viewed from a subject. The diaphragm 102 is provided with a shutter function. An incident light flux entering an optical system constituted by the lens 101 and the diaphragm 102 passes through the band-cutting element 107, and forms a subject image on the imaging surface of an image sensor 105. The subject image is converted into an electrical signal. The image sensor 105 includes a group of pixels in the Bayer array having red, green, and blue (RGB) color filters, and is controlled by an image sensor drive unit 106 having a timing generation circuit. However, the type and arrangement of the color filters in the image sensor 105 are not limited to this configuration. In the present exemplary embodiment, the image sensor 105 is also provided with an analog-to-digital (A/D) conversion function. The band-cutting element 107 is the above-described organic EC elements and guest host liquid crystals. The band-cut positions (wavelengths and bands) correspond to bright line positions of a light source, enabling distinguishing between bright lines. The band-cutting element 107 includes one or a plurality of types of elements depending on the number of light sources and the number of bright lines to be subjected to band-cutting, and achieves the band-cut function by controlling the applied potential. When a plurality of types of band-cutting elements is included, it may be thought that elements are laminated to cover at least a part of the pupil area (predetermined area) in the optical axis direction of the optical system. The image sensor 105 converts the light signal of the formed subject image into an image signal.

The image signal output from the image sensor 105 is input to a signal processing unit 112 which performs various signal processing on the image signal. More specifically, the signal processing unit 112 performs color interpolation processing, shading correction processing, aberration correction processing, white balance processing, color space conversion processing, gamma conversion processing, color balance processing, image compression and coding processing and the like. The signal processing unit 112 outputs the processed data to a display 116 serving as a display unit and a recording medium, such as a magnetic tape 115, a digital versatile disc (DVD) disk 117, and a memory card 118, in respectively applicable formats.

In cooperation with a camera microcomputer 111, the signal processing unit 112 analyzes image signals such as the luminance, color distribution, and frequency distribution, and calculates analysis information such as evaluation values for autofocus (AF) and automatic exposure control (AE) and captured scene determination information. Upon reception of the analysis information, the camera microcomputer 111 controls each block such as the lens drive unit 103 and the diaphragm drive unit 104.

A memory 109 functions as a work memory for the camera microcomputer 111 and the signal processing unit 112, and as a memory for temporarily storing image signals.

An operation unit 110 includes one device or a combination of devices such as switches, dials, touch panels, pointing devices for detecting user's line of sight and gesture, and a voice recognition apparatus. The operation unit 110 includes a first and a second shutter switch. By operating the first shutter switch, shooting preparation processing, such as AF processing and AE processing is performed, and various imaging parameters are fixed. By operating the second shutter switch, a signal for instructing to start a series of processing ranging from shooting to recording is transmitted to the camera microcomputer 111.

Figure 3:
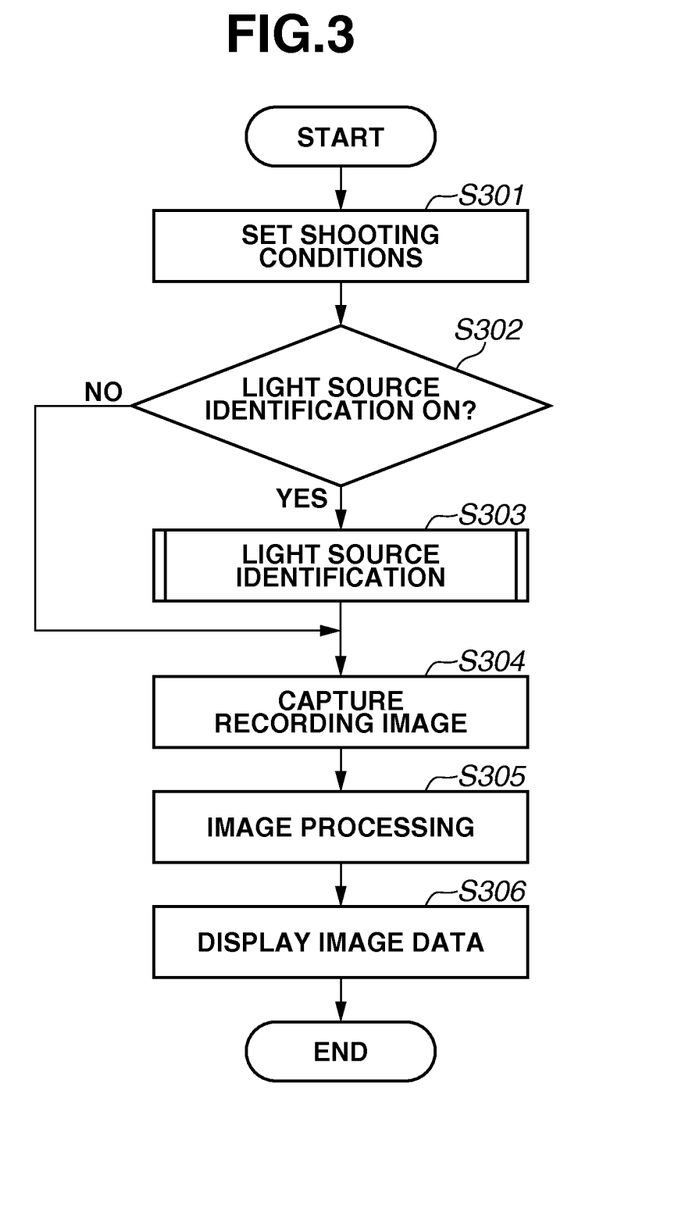
FIG. 3 is a flowchart showing light source identification, shooting, image processing, and recording according to a first exemplary embodiment.

FIG. 3 is a flowchart showing a series of processing ranging from shooting to recording including characteristic light source identification processing according to the present exemplary embodiment. Each step of the flowchart will be described below. This processing is started from a state where, after the power of the imaging apparatus is turned ON, image signals have been sequentially acquired from the image sensor 105. Processing in each step is executed by the camera microcomputer 111, or each block such as the signal processing unit 112 according to an instruction from the camera microcomputer 111.

In step S301, the camera microcomputer 111 sets various shooting conditions, such as Tv and Av exposure conditions, the zoom lens position, the focal lens position, gradation processing, and color conversion processing. In the present exemplary embodiment, a light source identification function is included in the shooting conditions, and can be turned ON or OFF. When band-cutting elements are correspondingly provided in a plurality of light sources, the identification processing may be turned ON or OFF for each light source to be detected (for each band-cutting element).

In step S302, based on analysis information, such as the shooting mode and captured scene, and the information set by the user in step S301, the camera microcomputer 111 determines whether the light source identification function is currently turned ON. When the light source identification function is turned ON for at least one type of light source (band-cutting element) (YES in step S302), then in step S303, the camera microcomputer 111 performs the light source identification processing by using the band-cutting element 107 (band-cutting element). The light source identification processing will be described in detail below. On the other hand, when the light source identification processing is completed or when all of the light source identification functions are OFF (NO in step S302), then in step S304, the camera microcomputer 111 performs processing for capturing a recording image. This image capturing may be either still image capturing or moving image capturing. In the case of still image capturing, the camera microcomputer 111 performs the above-described shooting preparation and recording image capture processing in response to operations of the first and the second shutter switches by the user.

In step S305, the signal processing unit 112 performs the above-described image processing on the still image or moving image captured in step S304. In the case of a moving image, the signal processing unit 112 performs image processing in parallel on sequentially captured frames. Specifically, in step S305, the signal processing unit 112 performs white balance processing, color balance processing, and color conversion processing based on the light source identification information identified in step S303. More specifically, for example, when a fluorescent lamp is identified as a light source in step S303, the signal processing unit 112 performs, according to the color temperature of the fluorescent lamp, processing based on the white balance gain, the color balance gain, or a lookup table for color conversion processing. The signal processing unit 112 may perform only a part of image processing based on the light source identification information.

In step S306, the camera microcomputer 111 displays on the display 116 image data output from the signal processing unit 112, for example, in a YUV format. Alternatively, the camera microcomputer 111 records image data in the JPEG or MPEG format on various recording media, such as the above-described magnetic tape 115, the DVD disk 117, and the memory card 118.

Figure 4:
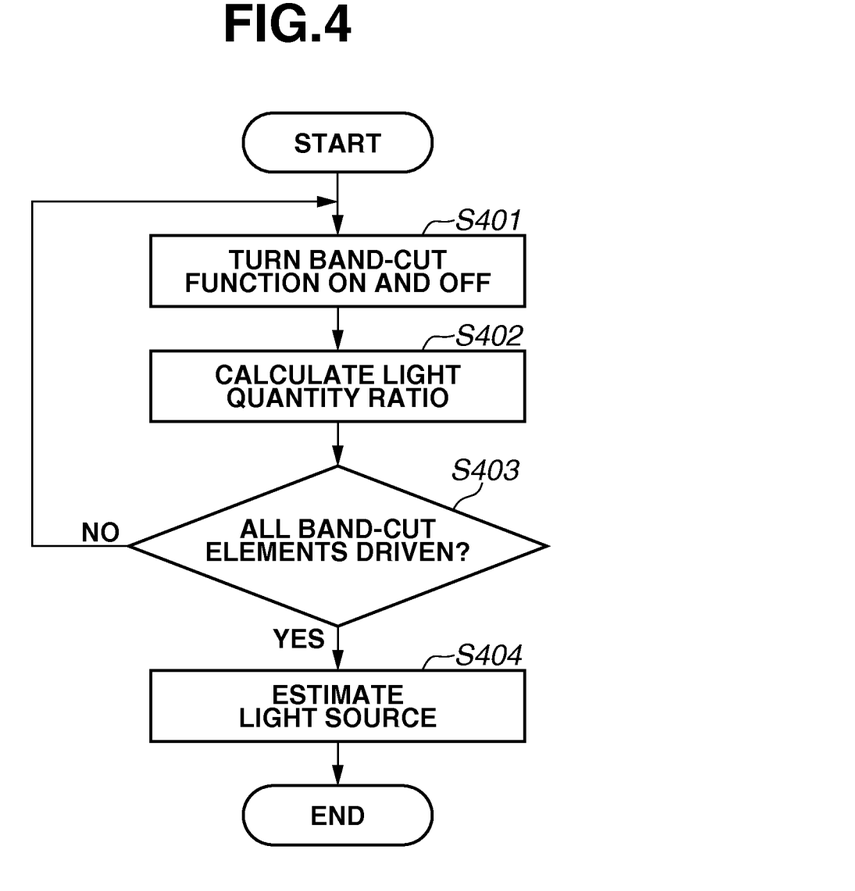
FIG. 4 is a flowchart showing light source identification processing according to the first exemplary embodiment.

FIG. 4 is a flowchart illustrating details of the light source identification processing in step S303 illustrated in FIG. 3. In step S401, the camera microcomputer 111 performs control to turn ON and OFF the band-cutting element 107 via the band-cutting element drive unit 108, and controls the image sensor 105 via the image sensor drive unit 106 to acquire an image signal. Specifically, the camera microcomputer 111 captures the image signal (first image signal) when the band-cut function of the band-cutting element 107 is ON, and captures the image signal (second image signal) when the band-cut function of the band-cutting element 107 is OFF. The band-cut positions and band-cut widths according to the present exemplary embodiment are (615±10) nm, (595±10) nm, (465±10) nm, (545±10) nm, and (480±10) nm corresponding to the positions of bright lines showing a large emission intensity of the fluorescent lamp, the mercury lamp, the white LED, the green LED, and the blue LED, respectively.

When capturing an image to detect the light quantity ratio in step S401, it is desirable that the subject is in in-focus state. The subject may have specific features such as a face, or may be a white subject.

In step S402, by using image signals sequentially acquired from the image sensor 105, the camera microcomputer 111 detects light quantities incident from the image sensor when the band-cutting element 107 is ON and OFF, and calculates the incidence light quantity ratio, i.e., the ratio of the incidence light quantity when the band-cutting element 107 is ON, to the light quantity when the band-cutting element 107 is OFF. The incidence light quantity may be calculated based on an RGB image signal, or based on a luminance signal converted from the RGB image signal. Although, in the present exemplary embodiment, the light quantity ratio is calculated through comparison of average values of RGB signals for the entire image of the image signal, the processing is not limited thereto. The light quantity ratio may be calculated through comparison of average values or representative values for predetermined areas of the image of the image signal.

In step S403, when the imaging apparatus has a plurality of types of band-cutting elements and the user has set a plurality of types of light source identifications, the camera microcomputer 111 determines whether all of the set band-cutting elements have been driven, and the light quantity ratio has been calculated. When all of the band-cutting elements have been driven (YES in step S403), all of the band-cutting elements are turned OFF. Then, in step S404, the camera microcomputer 111 performs light source identification based on the calculated light quantity ratio.

In the case of a broad light source, even if light is subjected to band-cutting at each position and width of the band-cutting element, the ratio of the light quantity when the band-cut function is ON, to the light quantity when the band-cut function is OFF, becomes close to 1. In the case of a bright-line light source, when light is subjected to band-cutting at each position and width of the band-cutting element, and the band-cut position agrees with the bright line position, the light quantity ratio becomes less than 1. In the present exemplary embodiment, the camera microcomputer 111 determines whether the ratio of the light quantity when the band-cutting element at the band-cut position and width (615±10) nm (corresponding to the fluorescent lamp) is ON, to the light quantity when the band-cut function is OFF, is less than 0.6. Further, the camera microcomputer 111 determines whether the ratio of the light quantity when the band-cutting element at the band-cut position and width (595±10) nm (corresponding to the mercury lamp) is ON, to the light quantity when the band-cut function is OFF, is less than 0.7. Further, the camera microcomputer 111 determines whether the ratio of the light quantity when the band-cutting element at the band-cut position and width (465±10) nm (corresponding to the white LED) is ON to the light quantity when the band-cut function is OFF, is less than 0.8. Further, the camera microcomputer 111 determines whether the ratio of the light quantity when the band-cutting element at the band-cut position and width (545±10) nm (corresponding to the green LED) is ON, to the light quantity when the band-cut function is OFF, is less than 0.1. Further, the camera microcomputer 111 determines whether the ratio of the light quantity when the band-cutting element at the band-cut position and width (480±10) nm (corresponding to the blue LED) is ON, to the light quantity when the band-cut function is OFF, is less than 0.1. If the light quantity ratio when each band-cutting element is ON, to the light quantity when the band-cut function is OFF, is less than the corresponding values, an applicable light source exists in step S404.

As described above, in the present exemplary embodiment, band-cutting elements corresponding to bright-line light sources are arranged on the imaging optical axis, and the potential of each band-cutting element is controlled to detect the light quantity. Thus, various types of light sources including bright-line light sources can be simply and correctly identified. By performing color processing, such as white balance processing, color balance processing, and color conversion processing according to identified light sources, an image having a tint suitable for each scene can be generated.

Figure 5:
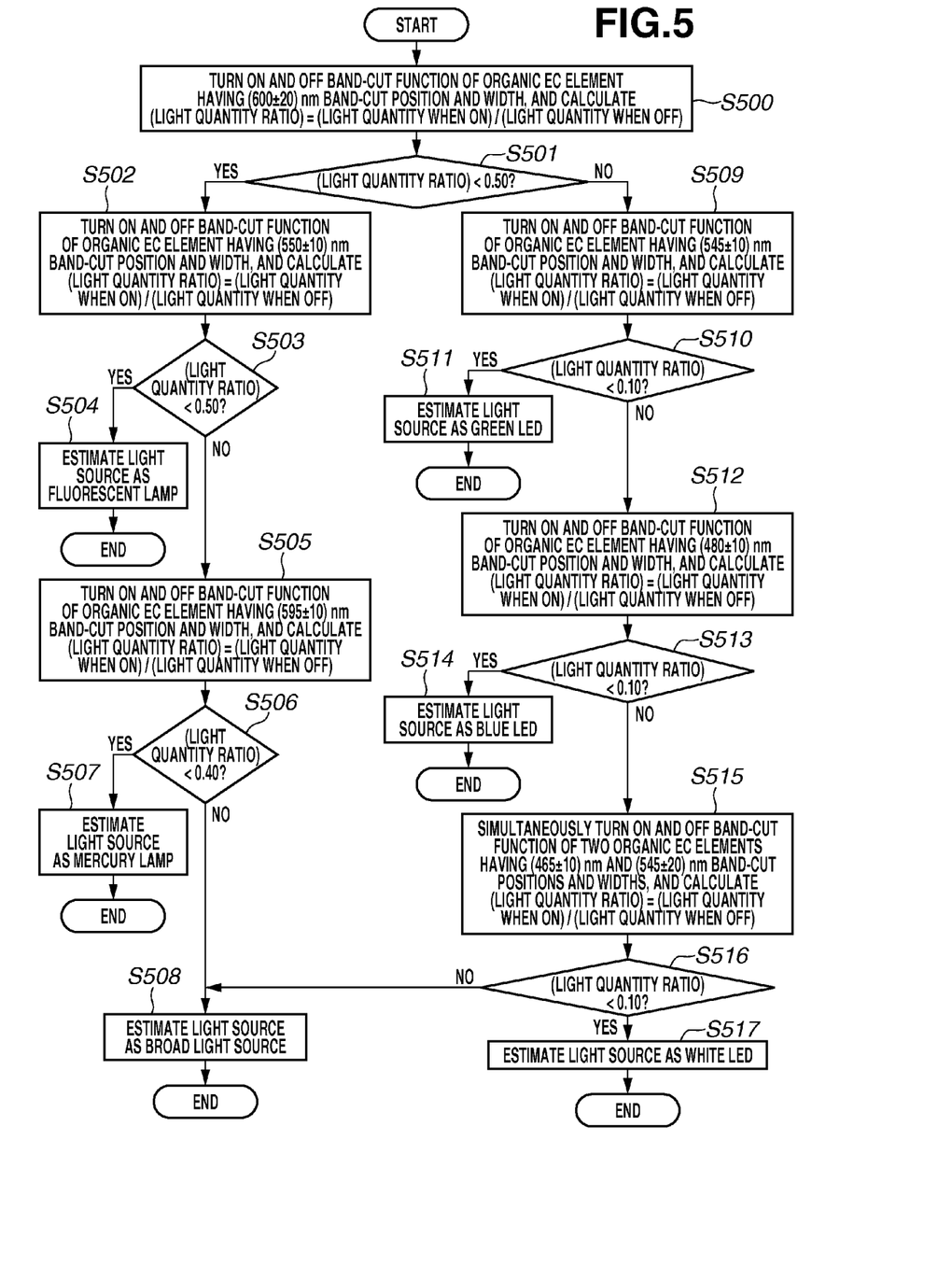
FIG. 5 is a flowchart showing light source identification processing according to a second exemplary embodiment.

The second exemplary embodiment differs from the first exemplary embodiment in that light sources are identified based on the priority. More specifically, the band positions and processing order of the band-cut function are arranged, and light sources having a high priority are preferentially identified while maintaining the accuracy of identification, thus increasing the speed of the light source identification processing. FIG. 5 is a flowchart showing details of the light source identification processing in step S303 illustrated in FIG. 3 according to the present exemplary embodiment.

In step S500, similar to step S401, the camera microcomputer 111 performs control to turn ON and OFF the band-cutting element 107 via the band-cutting element drive unit 108. In this case, the camera microcomputer 111 controls the image sensor 105 via the image sensor drive unit 106 to acquire image signals when the band-cutting element 107 is ON and OFF, and calculates the light quantity ratio. In the present exemplary embodiment, first, the camera microcomputer 111 turns ON and OFF the band-cut function at the band-cut position and width (600±20) nm corresponding to the bright line positions 590 nm and 630 nm of the fluorescent lamp and the bright line position 593 nm of the mercury lamp illustrated in FIG. 2.

In step S501, the camera microcomputer 111 determines whether the light quantity ratio calculated in step S500 is less than 0.50. When the light quantity ratio is determined to be less than 0.50 (YES in step S501), the processing proceeds to step S502. On the other hand, when the light quantity ratio is determined to be not less than 0.50 (NO in step S501), the processing proceeds to step S509.

In step S502, the camera microcomputer 111 acquires image signals when the band-cutting element 107 is turned ON and OFF at the band-cut position and width (550±10) nm, and calculates the light quantity ratio.

In step S503, the camera microcomputer 111 determines whether the light quantity ratio calculated in step S502 is less than 0.50. When the light quantity ratio is determined to be less than 0.50 (YES in step S503), then in step S504, the camera microcomputer 111 identifies the light source as a fluorescent lamp. Then, the processing exits this flowchart. On the other hand, when the light quantity ratio is determined to be not less than 0.50 (NO in step S503), the processing proceeds to step S505.

In step S505, the camera microcomputer 111 acquires image signals when the band-cutting element 107 is turned ON and OFF at the band-cut position and width (595±10) nm, and calculates the light quantity ratio.

In step S506, the camera microcomputer 111 determines whether the light quantity ratio calculated in step S505 is less than 0.40. When the light quantity ratio is determined to be less than 0.40 (YES in step S506), then in step S507, the camera microcomputer 111 identifies the light source as a mercury lamp. Then, the processing exits this flowchart. On the other hand, when the light quantity ratio is determined to be not less than 0.40 (NO in step S506), then in step S508, the camera microcomputer 111 identifies the light source as a broad light source. Then, the processing exits this flowchart.

In step S509, the camera microcomputer 111 acquires image signals when the band-cutting element 107 is turned ON and OFF at the band-cut position and width (545±10) nm, and calculates the light quantity ratio.

In step S510, the camera microcomputer 111 determines whether the light quantity ratio calculated in step S509 is less than 0.10. When the light quantity ratio is determined to be less than 0.10 (YES in step S510), then in step S511, the camera microcomputer 111 identifies the light source as a green LED. Then, the processing exits this flowchart. On the other hand, when the light quantity ratio is determined to be not less than 0.10 (NO in step S510), the processing proceeds to step S512.

In step S512, the camera microcomputer 111 acquires image signals when the band-cutting element 107 is turned ON and OFF at the band-cut position and width (480±10) nm, and calculates the light quantity ratio.

In step S513, the camera microcomputer 111 determines whether the light quantity ratio calculated in step S512 is less than 0.10. When the light quantity ratio is determined to be less than 0.10 (YES in step S513), then in step S514, the camera microcomputer 111 identifies the light source as a blue LED. Then, the processing exits this flowchart. On the other hand, when the light quantity ratio is determined to be not less than 0.10 (NO in step S513), the processing proceeds to step S515.

In step S515, the camera microcomputer 111 acquires image signals when the band-cutting element 107 is turned ON and OFF at the band-cut positions and widths (465±10) nm and nm (545±20), and calculates the light quantity ratio.

In step S516, the camera microcomputer 111 determines whether the light quantity ratio calculated in step S515 is less than 0.10. When the light quantity ratio is determined to be less than 0.10 (YES in step S516), then in step S517, the camera microcomputer 111 identifies the light source as a white LED. Then, the processing exits this flowchart. On the other hand, when the light quantity ratio is determined to be not less than 0.10 (NO in step S516), then in step S508, the camera microcomputer 111 identifies the light source as a broad light source. Then, the processing exits this flowchart.

As described above, in the present exemplary embodiment, band-cutting elements corresponding to bright-line light sources are arranged on the imaging optical axis, and the potential of each band-cutting element is controlled to detect the light quantity. Thus, various types of light sources including bright-line light sources can be simply and correctly identified. By performing color processing, such as white balance processing, color balance processing, and color conversion processing according to an identified light source, an image having a tint suitable for each scene can be generated. Further, by arranging the band-cut position and width and the processing order for light source identification, a light source having a high priority can be quickly identified.

It is also possible to combine the method for operating the organic EC elements in random order according to the first exemplary embodiment, with the method for operating the organic EC elements in predetermined order according to the second exemplary embodiment. It is also possible to operate a part of the plurality of organic EC elements in random order and the remaining elements in predetermined order.

(First Modification)

A first modification differs from the first and the second exemplary embodiments in that it further calculates the light quantity distribution for a plurality of areas in image signals to identify a light source for each area. The principle of light quantity distribution calculation and storage will be described below. Band-cutting elements for cutting only bright lines of a certain bright-line light source X out of the plurality of identified bright-line light sources are turned ON, and the light quantity distribution of the entire image is measured (referred to as $I^X_{ON}$). A light quantity distribution I is a matrix having m rows and n columns. (m, n) represents the position of each block which includes a plurality of pixels, p×q pixels. Then, all of the band-cutting elements are turned OFF, and the light quantity distribution of the entire image is measured (referred to as $I_0$). Since $I^X_{ON}$ is obtained by excluding the effect of bright lines of the bright-line light source X from $I_0$, the light quantity distribution resulting from the bright-line light source X is calculated as $I_0 - I^X_{ON}$ for the entire image, and then stored. The light quantity distribution for bright-line light sources other than the bright-line light source X is similarly calculated and stored. The above-described difference $I_0-I^X_{ON}$ may be, for example, a ratio $I^X_{ON}/I_0$ or $(I_0-I^X_{ON})/I_0$.

The light quantity distribution can be calculated and stored by using the above-described method only in a case where there is no bright line overlapping between a plurality of bright-line light sources. Particularly, the method according to the present invention is usable when two different bright-line light sources are provided and in three different cases: a case where bright lines of one light source include bright lines of another light source, a case where some bright lines overlap between the two light sources and the other bright lines are specific to either one light source, and a case where there is no overlapping of bright lines.

Specifically, it is presumed in a following case that bright lines of one bright-line light source (a bright-line light source Y) include bright lines of a bright-line light source Z. This means that (bright lines of bright-line light source Y)=(bright lines overlapping between bright-line light sources Y and Z)+(bright lines specific to bright-line light source Y).

Band-cutting elements for cutting bright lines specific to one bright-line light source (the bright-line light source Y) are turned ON, and the light quantity distribution of the entire image is measured (referred to as $I^Y_{ON}$). Then, all of the band-cutting elements are turned OFF, and the light quantity distribution of the entire image is measured (referred to as $I_0$). Since $I^Y_{ON}$ is obtained by excluding the effect of bright lines specific to the bright-line light source Y from $I_0$, the light quantity distribution resulting from bright lines specific to the bright-line light source Y is calculated as $I_0-I^Y_{ON}$ for the entire image. The light quantity distribution resulting from all bright lines of the bright-line light source Y is calculated as $(I_0-I^Y_{ON})/k^Y_{ON}$ for the entire image. Here, the ratio of cut bright lines specific to the bright-line light source Y, to the bright line spectrum of the bright-line light source Y is $k^Y_{ON}$ (desirably prestored).

Since there are two bright-line light sources, all of light quantities not resulting from the bright-line light source Y are determined to result from the bright-line light source Z. Since the light quantity distribution resulting from all bright lines of the bright-line light source Y is $(I_0-I^Y_{ON})/k^Y_{ON}$, the light quantity distribution resulting from all bright lines of the bright-line light source Z is $I_0-(I_0-I^Y_{ON})/k^Y_{ON}$.

When two different bright-line light sources are provided, the above light quantity distribution calculation and storage method is usable in three different cases: a case where bright lines of one light source include bright lines of another light source, a case where some bright lines overlap between the two light sources and the other bright lines are specific to either one of the light sources, and a case where there is no overlapping bright line. This is because at least one bright-line light source have specific bright lines.

The emission intensity of bright-line light sources in each area is determined through comparison between the prestored light quantity distribution for each bright-line light source with the result of area division. The mixture ratio between the bright-line light sources can be calculated based on the result. Image processing parameters in each area can be calculated based on the mixture ratio and a plurality of identified light sources. More specifically, image processing parameters for mixed areas are calculated based on image processing parameters suitable for the plurality of identified light sources. When using pixels on a pixel basis, the mixture ratio between the bright-line light sources can be calculated based on the emission intensity of each pixel of each bright-line light source. Image processing parameters (parameters of color processing, such as white balance processing, color balance processing, and color conversion processing) for each pixel can be calculated based on the mixture ratio.

When capturing an image, all of the band-cutting elements are turned OFF, and light of all of the bright-line light sources enters the image sensor. Image processing for each calculated area and each pixel is performed on each area and each pixel of the captured image.

The following describes specific operations in each exemplary embodiment for light source identification processing on a plurality of areas of the above-described image signals, and image processing based on the identification result.

In step S303, the camera microcomputer 111 performs light source identification processing on a plurality of areas of the image signal to acquire light source identification information corresponding to the identification result. In step S404, the camera microcomputer 111 performs light source identification for each area based on the result of comparison of the calculated light quantity distributions.

In step S305, the signal processing unit 112 performs white balance processing, color balance processing, and color conversion processing on each of the plurality of areas of the image signal based on the light source identification information acquired in step S303. In this case, only a part of the above-described image processing may be performed based on the light source identification information. Further, areas for light source identification do not necessarily need to coincide with areas applicable for color conversion processing based on the identification result. For example, areas applicable for color conversion processing may more overlap with each other.

In the present modification, the camera microcomputer 111 divides the image signal into a plurality of areas, compares average values of the RGB signals in each area, and calculates the light quantity ratio. The incidence light quantity may be calculated based on the RGB image signals, or based on a luminance signal converted from the RGB image signals.

A third exemplary embodiment differs from the first and the second exemplary embodiments in that an image is captured by controlling the light flux from a specific light source by using band-cutting elements based on the light source identification information acquired by a similar technique to the first and the second exemplary embodiments.

The flowchart of a series of processing ranging from shooting to recording according to the present exemplary embodiment can be similarly illustrated to that in FIG. 3. However, the present exemplary embodiment differs from the first exemplary embodiment in the processing performed in steps S303 and S304.

In step S304, to solve the problem that the image quality is degraded by a light source having a large light quantity, the camera microcomputer 111 checks the magnitude of the incidence light quantity when all of the band-cutting elements 107 are turned OFF, and, when the incidence light quantity is larger than a threshold value, turns ON the band-cutting element 107 corresponding to the identified light source. This enables limiting of the light flux of a predetermined light source identified in step S303 out of the light fluxes radiated onto the subject within the image frame, thus obtaining an image having a suitable light quantity. The incidence light quantity may be calculated based on an RGB image signal, or based on a luminance signal converted from the RGB image signal.

Figure 6:
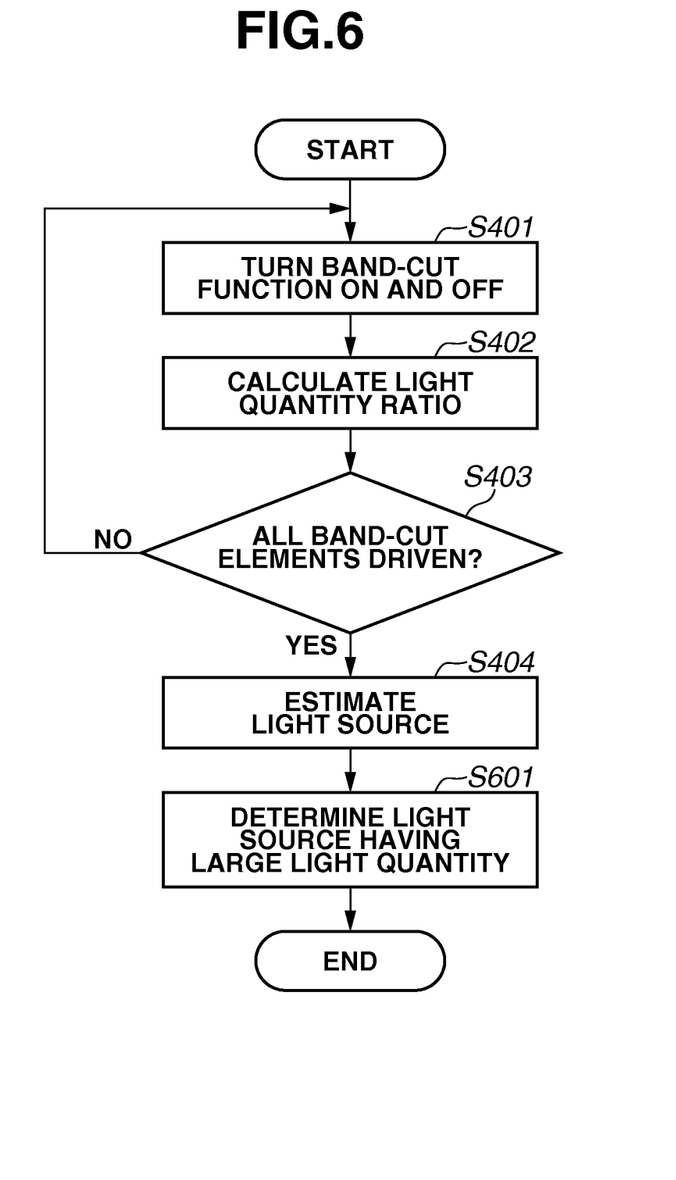
FIG. 6 is a flowchart showing light source identification processing according to a third exemplary embodiment.

FIG. 6 is a flowchart showing details of the light source identification processing in step S303 according to the present exemplary embodiment. Steps identical to those illustrated in FIG. 4 are assigned the same step number, and redundant descriptions thereof will be omitted.

In step S601, the camera microcomputer 111 determines the magnitude of the incidence light quantity in a state where all of the band-cutting elements 107 are turned OFF in step S403. The incidence light quantity may be calculated from the RGB signals or from the luminance signal. In the present exemplary embodiment, when at least either one of average values of the entire image of the RGB signals is equal to or larger a threshold value, the camera microcomputer 111 determines that the incidence light quantity is large, and sets a flag for limiting the light flux by the band-cutting element 107 in step S304. When each average value of the entire image of the RGB signals is less than the threshold value, the camera microcomputer 111 sets a flag for not limiting the light flux, and the processing exists this flowchart.

As described above, in the present exemplary embodiment, band-cutting elements corresponding to bright-line light sources are arranged on the imaging optical axis, and the potential of each band-cutting element is controlled to detect the light quantity. Thus, various types of light sources including bright-line light sources can be simply and correctly identified. Further, by performing color processing, such as white balance processing, color balance processing, and color conversion processing according to the identified light source, an image having a tint suitable for each scene can be generated.

Also in the light source identification processing according to the present exemplary embodiment, instead of the light source identification processing up to step S404, the light source identification procedures may be performed with prioritization as in the second exemplary embodiment.

First Comparative Example

Identification of a fluorescent lamp (bright-line light source) and a mercury lamp (bright-line light source) or a fluorescent lamp of a different type will be made below.

According to the descriptions in Japanese Patent Application Laid-Open No. 2007-110485, the ratio of the light quantity of a green element to that of a monochrome element is estimated to be 0.49 for a fluorescent lamp (the spectrum is illustrated in FIG. 6 of Japanese Patent Application Laid-Open No. 2007-110485), and 0.79 for a mercury lamp (the spectrum is illustrated in FIG. 7 of Japanese Patent Application Laid-Open No. 2007-110485).

According to approximate calculations based on descriptions in Japanese Patent Application Laid-Open No. 2006-146081, the ratio of the light quantity when the band-cut function of an EC element (having a 250-nm band-cut width) is ON, to that when the band-cut function is OFF, is estimated to be 0.29 for a fluorescent lamp (the spectrum is illustrated by "C3" (fluorescent lamp) in FIG. 4), and 0.33 for another fluorescent lamp (the spectrum is illustrated by "C2" (daylight fluorescent lamp) in FIG. 3).

In the present invention, the ratio of the light quantity when the band-cut function of the organic EC element (made of a specific compound) is ON, to that when the band-cut function is OFF, is estimated to be 0.40 in a case of a fluorescent lamp (the spectrum is illustrated in FIG. 6 of Japanese Patent Application Laid-Open No. 2007-110485), and 0.20 in a case of a mercury lamp (the spectrum is illustrated in FIG. 7 of Japanese Patent Application Laid-Open No. 2007-110485).

Of the light quantity ratios in the case of a fluorescent lamp, a mercury lamp, and another fluorescent lamp, the ratio of the smaller light quantity ratio to the larger one is 0.62 according to the method of Japanese Patent Application Laid-Open No. 2007-110485, 0.88 according to the method of and Japanese Patent Application Laid-Open No. 2006-146081, and 0.50 (smallest) according to the method of the present invention. As a result, according to the method of the present invention, the light sources can be most clearly identified.

Second Comparative Example

Distinguishing between an A light source (halogen lamp) as a broad light source and a fluorescent lamp (bright-line light source) will be presumed below.

According to descriptions of Japanese Patent Application Laid-Open No. 2006-146081, the ratio of the light quantity when the band-cut function of the EC element (having a 250-nm band-cut width) is ON, to that when the band-cut function is OFF is 0.22 in a case of an A light source (a halogen lamp of which the spectrum is illustrated by "A2" in FIG. 3), and 0.29 in a case of a fluorescent lamp (the spectrum is illustrated by "C3" in FIG. 4).

In the method according to the present invention, the ratio of the light quantity when the band-cut function of the organic EC element is ON, to that when the band-cut function is OFF is 0.90 in a case of an A light source (a halogen lamp of which the spectrum is illustrated by "A2" in FIG. 3), and 0.50 in a case of a fluorescent lamp (the spectrum is illustrated by "C3" in FIG. 4).

Of the light quantity ratios in a case of an A light source (halogen lamp) and a fluorescent lamp, the ratio of the smaller light quantity ratio to the larger one is 0.76 according to the method of Japanese Patent Application Laid-Open No. 2006-146081, and 0.56 (smaller) according to the method according to the present invention. As a result, according to the method of the present invention, the light sources can be more clearly identified.

The present exemplary embodiment is applicable not only to apparatuses capable of shooting as a main function, such as digital cameras, but also to apparatuses having a built-in or externally connected imaging apparatus, such as mobile phones, personal computers (such as laptop type, desktop type, and tablet type PCs), and game machines. Therefore, the "imaging apparatus" in the present specification includes any electronic apparatuses having the imaging function, as its intended application.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application NO. 2013-258425 filed Dec. 13, 2013, No. 2013-258426 filed Dec. 13, 2013, No. 2014-137249 filed Jul. 2, 2014, and No. 2014-137250 filed Jul. 2, 2014, which are hereby incorporated by reference herein in their entirety.

What is claimed is:

1. An imaging apparatus comprising:
an imaging unit configured to convert an incident light flux from an optical system into an electric signal, and output an image signal;
a band-cutting element included in the optical system, having a band-cut function of performing band-cutting to enable distinguishing between light wavelengths corresponding to bright line positions of a light source having bright lines;
a control unit configured to control the band-cut function of the band-cutting element; and
an identification unit configured to identify a light source of an image captured by the imaging unit through comparison between a first image signal captured by the imaging unit when the band-cut function of the band-cutting element is ON and a second image signal captured by the imaging unit when the band-cut function of the band-cutting element is OFF.

2. The imaging apparatus according to claim 1, further comprising:
an image processing unit configured to perform image processing based on the light source identified by the identification unit.

3. The imaging apparatus according to claim 2, wherein the image processing unit performs at least one of white balance processing, color balance processing, and color conversion processing based on the light source identified by the identification unit.

4. The imaging apparatus according to claim 2, further comprising:
a recording unit configured to, after a light source is identified by the identification unit, record in a recording medium an image captured by the imaging unit in a state where all of the band-cut functions are controlled to OFF by the control unit.

5. The imaging apparatus according to claim 1, wherein the control unit turns ON the band-cut function corresponding to the light source identified by the identification unit, and instructs the imaging unit to capture an image.

6. The imaging apparatus according to claim 1, wherein the band-cutting element is an organic electrochromic element.

7. The imaging apparatus according to claim 1, wherein the band-cutting element is a guest host liquid crystal.

8. The imaging apparatus according to claim 1, wherein the identification unit identifies a light source based on a band subjected to band-cutting by the control unit and the result of comparison between the first and the second image signals.

9. The imaging apparatus according to claim 1, wherein, when as a result of comparison, the ratio of the first image signal to the second image signal is larger than a threshold value, the identification unit identifies a light source as the source corresponding to the band subjected to band-cutting by the control unit.

10. The imaging apparatus according to claim 1, wherein, when the band-cut function corresponding to a plurality of light sources is controlled by the control unit, in a case where any of the ratios of the first image signal to the second image signal are less than a threshold value, the identification unit identifies the light source of the image captured by the imaging unit as a broad light source.

11. The imaging apparatus according to claim 1, wherein, the control unit performs control to turn ON and OFF the band-cut function for each light source, and
wherein the identification unit identifies each light source through comparison between the ratio of the first and the second image signals and a threshold value, for each light source.

12. The imaging apparatus according to claim 1, wherein, when a desired light source is identified by the identification unit, the control unit and the identification unit end operation.

13. The imaging apparatus according to claim 1, wherein the bright line positions subjected to band-cutting by the band-cutting element correspond to at least one of bright line positions of a fluorescent lamp, a mercury lamp, and a light emitting diode.

14. The imaging apparatus according to claim 1, wherein the band-cutting element has a band-cut width within 20 nm.

15. The imaging apparatus according to claim 1, wherein the band-cutting element has any one of band-cut positions 615 nm, 595 nm, 465 nm, 545 nm, and 480 nm.

16. The imaging apparatus according to claim 1, wherein the identification unit identifies a light source based on an image signal captured in the in-focus state of a subject.

17. A method for controlling an imaging apparatus having a band-cutting element included in an optical system for guiding a light flux to an imaging unit, and provided with a band-cut function of performing band-cutting to enable distinguishing between light wavelengths corresponding to bright line positions of a light source having bright lines, the method comprising:
controlling the band-cut function of the band-cutting element; and
identifying a light source of an image captured by the imaging unit through comparison between a first image signal captured by the imaging unit when the band-cut function of the band-cutting element is ON, and a second image signal captured by the imaging unit when the band-cut function of the band-cutting element is OFF.

18. A non-transitory computer readable storage medium storing a program for causing a computer to execute each step of the imaging apparatus control method according to claim 17.

19. An imaging apparatus comprising:
an imaging unit configured to convert an incident light flux from an optical system into an electric signal, and output an image signal;
a band-cutting element included in the optical system, having a band-cut function of performing band-cutting to enable distinguishing between light wavelengths corresponding to bright line positions of a light source having bright lines;
a control unit configured to control the band-cut function of the band-cutting element; and
an identification unit configured to identify a light source of an image captured by the imaging unit through detection of changes in the value of the image signal by band-cutting using the band-cutting element.

20. A method for controlling an imaging apparatus having a band-cutting element included in an optical system for guiding a light flux to an imaging unit, and provided with a band-cut function of performing band-cutting to enable distinguishing between light wavelengths corresponding to bright line positions of a light source having bright lines, the method comprising:
  controlling the band-cut function of the band-cutting element; and
  identifying a light source of an image captured by the imaging unit through detection of changes in the value of the image signal by band-cutting using the band-cutting element.

* * * * *